United States Patent

[11] 3,624,102

[72] Inventors Richard E. Brown
Hanover;
John Shavel, Jr., Mendham, both of N.J.
[21] Appl. No. 826,656
[22] Filed May 21, 1969
[45] Patented Nov. 30, 1971
[73] Assignee Warner-Lambert Company
Morris Plains, N.J.

[54] SUBSTITUTED BENZOPYRANOPYRAZOLES
15 Claims, No Drawings
[52] U.S. Cl. ............................................... 260/310 R,
260/345.5, 260/999
[51] Int. Cl. .................................................. C07d 49/18
[50] Field of Search ........................................ 260/310 R

[56] References Cited
OTHER REFERENCES
Imperial Chemical Industries Chem. Abstr. Vol. 65. columns 2270–1 (1966).QD1.A51
Kirmse et al. Chem. Abstr. Vol. 67, Abstr. 90605m (1967). QD1.A51

Primary Examiner—Natalie Trousof
Attorneys—Albert H. Graddis, Henry E. Millson, Jr, Frank S. Chow, Neil D. Edwards and Ann M. Kelly ABSTRACT: A class of benzopyranopyrazoles of the formula:

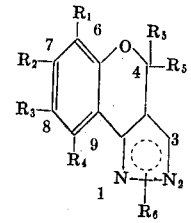

I are disclosed. In the above formula $R_1$, $R_2$, $R_3$, and $R_4$ are hydrogen, hydroxy, lower alkoxy, or ω-diloweralkylaminoloweralkoxy; $R_5$ is hydrogen or lower alkyl; $R_6$ is hydrogen, lower alkyl, aryl, aralkyl, or ω-diloweralkylaminoloweralkyl group. These compounds exert a mild depressant activity on the central nervous system of a mammalian host and are useful in the relief of mild and moderate anxiety.

SUBSTITUTED BENZOPYRANOPYRAZOLES

The present invention relates to compositions of matter; and more particularly, the present invention relates to benzopyranopyrazoles having the following structural formula:

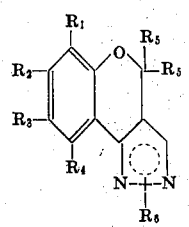

wherein $R_1$, $R_2$, $R_3$, and $R_4$ are hydrogen, hydroxy, lower alkoxy, or ω-diloweralkylaminoloweralkoxy; $R_5$ is hydrogen or lower alkyl; $R_6$ is hydrogen, lower alkyl, aryl or aralkyl or ω-diloweralkylaminoloweralkyl.

As used in this disclosure the term "lower alkyl" and the "lower alkyl" portion of ω-diloweralkylaminoloweralkyl and ω-diloweralkylaminoloweralkoxy includes hydrocarbons having one to seven carbon atoms in the carbon chain. It includes straight chain as well as branched chain radicals. The term includes, for example, methyl, propyl, isopropyl and the like. The term "aryl" as used throughout this disclosure denotes a monocyclic aromatic hydrocarbon radical, preferably of six to 10 carbon atoms, such as for example, phenyl, tolyl and the like. The term "aryl" also includes aromatic hydrocarbons as defined above, in which one or more hydrogen atoms of the phenyl portion have been substituted by a functional group, such as, halogen, hydroxyl, lower alkyl, trifluoromethyl, amino, substituted amino, or lower alkoxy. The term "aralkyl" encompasses lower alkyl groups, in which an aryl group as defined above is substituted for a hydrogen atom, such as for example, benzyl, phenethyl and the like and also includes such groups in which one or more of the hydrogen atoms of the phenyl portion have been substituted by a functional group as indicated above.

The pyrazole ring in the above formula has two double bonds represented by the dotted circle, the positions of which depend on location of the $R_6$ substituent. When $R_6$ is hydrogen, it is understood that the positions of the double bonds and of the hydrogen atom cannot be fixed. In this case, the partial structures IA and IB below represent tautomeric forms:

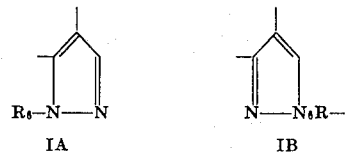

When $R_6$ is other than hydrogen, the bonds are as shown in Structures IA and IB, which in this case represent different compositions of matter.

According to the present invention, the above compounds can be prepared by the following flow sheet:

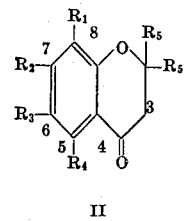

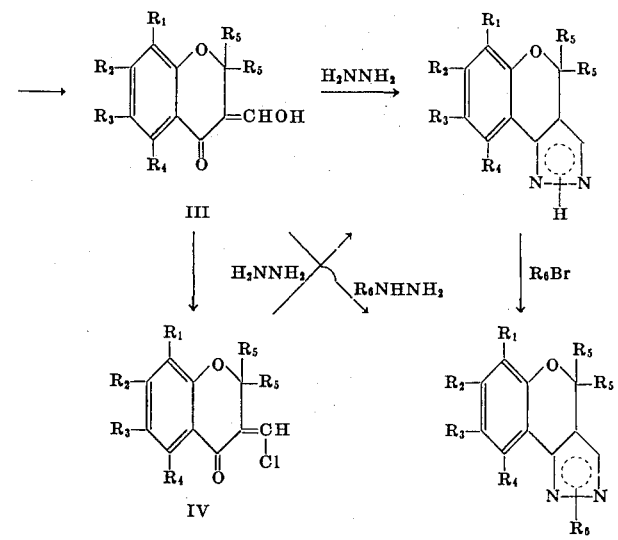

In the first step, a chromanone represented by formula II is reacted with ethyl formate in the presence of a strong base, such as sodium hydroxide or sodium methoxide to produce the hydroxymethylene derivative, III. Two routes from III to the compounds of the invention are available.

In the first of these, direct reaction of III with hydrazine or a substituted hydrazine leads to the target compounds. Alternatively, the hydroxymethylene ketone, III, is converted to the chloromethylene ketone, IV, and the latter reacted with hydrazine. This reaction is best carried out with reagents such as thionyl chloride or phosphorus pentachloride.

In addition, when $R_6$ is hydrogen, it is alkylated with a suitable alkyl or aralkyl halide, such as methyl or ethyl bromide to obtain the N-substituted compounds of this invention.

Compounds with $R_1$, $R_2$, $R_3$, or $R_4$ being OH are best obtained from the corresponding alkoxy derivatives by treatment with acids, such as hydrobromic acid.

Starting Compound II is disclosed for example in the following publications:

1. W. Bridge, A. J. Crocker, T. Cubin, and A. Robertson, *J. Chem. Soc.*, 1530 (1937)
2. W. Bridge, R.G. R. G. and A. Robertson, *J. Chem. Soc.*, 279 (1937)
3. H. B. Bhat and K. Venkataraman, *Tetrahedron*, 19, 77 (1963) (1954)
4. O. Dann, G. Volz, and O. Huber, *Ann.*, 587, 16 (1954)
5. J. H. Richards, A. Robertson, and J. Ward, *J Chem. Soc.*, 1610 (1948)

The compounds of this invention produce central nervous system depression in mammals, such as rats and monkeys.

They are useful as sedative, hypnotic, or tranquilizer. They are useful in conditions wherein sedation or tranquilizing is indicated, such as for example, mild to moderate anxiety. A daily dose of about 100 mg. to 500 mg./kg., orally or by injection, divided in several doses is recommended to produce the desired sedation. This dosage regimen can be readily varied according to the degree of sedation required, the species, the age, weight, and sex of the mammal being treated by methods well known to the healing arts.

In order to use these compounds they are combined with known pharmaceutical excipients, for example, lactose, mannitol, dicalcium phosphate, to form dosage forms suitable for oral administration, such as tablets, dispersible powders, capsules and the like. They can also be combined with parenterally acceptable vehicles, such as water for injection or sesame oil to form dosage forms suitable for parenteral administration. Additionally, they can be combined with excipients, such as cocoa butter, carbowax to form dosage forms, such as suppositories. They can also be mixed with animal feed for administration to animal colonies.

The compounds of our invention may be converted into their pharmaceutically acceptable nontoxic acid addition salts by conventional procedures. Exemplary of nontoxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques.

The following examples are included in order further to illustrate the invention.

EXAMPLE 1

2,2-Dimethyl-3-formyl-6,7-dimethoxy-4-chromanone

A solution of 11.6 g. of 6,7-dimethoxy-2,2-dimethyl-4-chromanone in 150 ml. of benzene is added at 15° C. to dry sodium methoxide (from 3.8 g. of sodium). To the resulting suspension is added 10 ml. of ethyl formate in 50 ml. of benzene. The mixture is stirred 4 hours at room temperature. One liter of ether is added, followed by 200 ml. of 2N HCl. The layers are separated, cross washed, and the combined ether layers are washed five times with 1N NaOH solution. The alkali washes are combined and poured onto ice-2N HCl. The gummy precipitate is extracted with ether to give 12.65 g. of 2,2-dimethyl-3-formyl-6,7-dimethoxy-4-chromanone as a white solid which is used directly for subsequent work.

$\nu_{max}^{Nujol}$ 1630, 1640 cm.$^{-1}$.

EXAMPLE 2

2,2-Dimethyl-3-formyl-7-methoxy-4-chromanone

Is prepared from 7-methoxy-2,2-dimethyl-4-chromanone as described in example 1, as a white solid, m.p. 68°–70° C.

$\nu_{max}^{Nujol}$ 1620, 1640 cm.$^{-1}$.

Anal. Calcd. for $C_{13}H_{14}O_4$: C, 66.65; H, 6.02. Found: C, 66.82; H, 5.99.

EXAMPLE 3

2,2-Dimethyl-3-formyl-7,8-dimethoxy-4-chromanone
Is prepared from 2,2-dimethyl-7,8-dimethoxy-4-chromanone, as described in example 1, as a dark oil.

$\nu_{max}^{film}$ 1600–1640 cm.$^{-1}$.

EXAMPLE 4

2,2-Dimethyl-3-formyl-5,7-dimethoxy-4-chromanone
Is prepared from 2,2-dimethyl-5,7-dimethoxy-4-chromanone, as described in example 1, as a white solid.

$\nu_{max}^{Nujol}$ 1625, 1640 cm.$^{-1}$.

EXAMPLE 5

2,2-Dimethyl-3-formyl-5-hydroxy-7-butoxy-4-chromanone
Is prepared from 2,2-dimethyl-5-hydroxy-7-butoxy-4-chromanone, as described in example 1, as a white solid, m.p. 80°–81.

$\nu_{max}^{Nujol}$ 1630, 1640 cm.$^{-1}$.

Anal. Calcd. for $C_{16}H_{20}O_5$: C, 65.74; H, 6.90. Found: C, 65.99; H, 6.86.

EXAMPLE 6

2,2-Dimethyl-3-formyl-7-[3-(dimethylamino)propoxy]-4-chromanone
Is prepared from 2,2-dimethyl-7-[3-(dimethylamino)propoxyl]-4-chromanone, as described in example 1, as a yellow oil.

$\nu_{max}^{film}$ 1600–1640 cm.$^{-1}$.

EXAMPLE 7

2-Methyl-3-formyl-7-methoxy-4-chromanone
Is prepared from 2-methyl-7-methoxy-4-chromanone, as described in example 1, as a yellow oil.

$\nu_{max}^{film}$ 1600–1640 cm.$^{-1}$.

EXAMPLE 8

1,4-Dihydro-7-methoxy-4,4-dimethyl[1]benzopyrano-[4,3-c]pyrazole

A solution of 81.1 g. of 2,2-dimethyl-3-formyl-7-methoxy-4-chromanone in 1.5 liters of ethanol is heated with 90 ml. of 97 percent hydrazine and the mixture is refluxed for 3 hours, then left overnight. The solution is concentrated to dryness and taken up in 800 ml. of methylene chloride. The cloudy solution is clarified with charcoal and the methylene chloride replaced by ether. The ether solution is then concentrated to 400 ml. volume and is cooled to give 36.2 g. of 1,4-dihydro-7-methoxy-4,4-dimethyl[1]benzopyrano-[4,3-c]pyrazole, m.p. 168°–169° after recrystallization from methylene chloride-ether.

$\nu_{max}^{Nujol}$ 1625, 3150 cm.$^{-1}$.

Anal.Calcd. for $C_{13}H_{14}N_2O_2$: C, 67.81; H, 6.13; N, 12.17. Found: C, 68.08; H, 6.28; N, 12.15.

EXAMPLE 9

2,4-Dihydro-7,8-dimethoxy-4,4-dimethyl[1]benzopyrano[4,3-c]pyrazole

Is prepared from 2,2-dimethyl-3-formyl-6,7-dimethoxy-4-chromanone and hydrazine, as described in example 8. The material melts at 128°–130°.

$\nu_{max}^{Nujol}$ 1620, 3100 cm.$^{-1}$.

Anal. Calcd. for $C_{14}H_{16}N_2O_3$: C, 64.60; H, 6.20; N, 10.76. Found: C, 64.89; H, 6.33; N, 11.05.

EXAMPLE 10

1,4-Dihydro-7,9-dimethoxy-4,4-dimethyl[1]benzopyrano[4,3-c]pyrazole

Is prepared from 2,2-dimethyl-3formyl-5,7-dimethoxy-4-chromanone and hydrazine, as described in example 8. The material melts at 147°–148°.

$\nu_{max}^{Nujol}$ 1635, 3250 cm.$^{-1}$.

Anal. Calcd. for $C_{14}H_{16}N_2O_3$: C, 64.60; H, 6.20; N, 10.76. Found: C, 64.63; H, 6.25; N, 10.68.

EXAMPLE 11

1,4-Dihydro-7-butoxy-4,4-dimethyl[1]benzopyrano[4,3-c]pyrazol-9-ol

Is prepared from 2,2-dimethyl-3-formyl-5-hydroxy-7-butoxy-4-chromanone and hydrazine, as described in example 8. The material melts at 120°.

$\nu_{max}^{Nujol}$ 1640, 3300, 3450 cm.$^{-1}$.

Anal. Calcd. for $C_{16}H_{20}N_2O_3$: N, 9.72. Found: N, 9.60.

EXAMPLE 12

1,4-Dihydro-6,7-dimethoxy-4,4-dimethyl[1]benzopyrano[4,3-c]pyrazole

Is prepared from 2,2-dimethyl-3-formyl-7,8-dimethoxy-4-chromanone and hydrazine, as described in example 8. The product melts at 164°–165°.

$\nu_{max}^{Nujol}$ 1625, 3325, cm.$^{-1}$.

Anal. Calcd. for $C_{14}H_{16}N_2O_3$: C, 64.60; H, 6.20; N, 10.76. Found: C, 64.71; H, 6.20; N, 10.97.

EXAMPLE 13

1,4-Dihydro-7-[3-(dimethylamino)propoxyl]-4,4-dimethyl[1]benzopyrano[4,3-c]pyrazole dihydrobromide Is prepared from 2,2-dimethyl-3-formyl-7-[3-(dimethylamino)propoxy]-4-chromanone and hydrazine, as described in example 8. The oily free base is converted to its dihydrobromide salt which melts at 221°–224°.

$\nu_{max}^{Nujol}$ 1625 cm.$^{-1}$.

Anal. Calcd. for $C_{17}H_{23}N_3O_2$ 2HBr: C, 44.08; H, 5.44; N, 9.07. Found: C, 44.25; H, 5.50; N, 8.95.

EXAMPLE 14

1,4-Dihyrdo-7-methoxy-4-methyl[1]benzopyrano[4,3-c]pyrazole

Is prepared from 2-methyl-3-formyl-7-methoxy-4-chromanone and hydrazine, as described in example 8. The product melts at 141°.

$\nu_{max}^{Nujol}$ 1630, 3150 cm.$^{-1}$.

Anal. Calcd. for $C_{12}H_{12}N_2O_2$: C, 66.65; H, 5.59; N, 12.96. Found: C, 66.78; H, 5.67; N, 13.08.

EXAMPLE 15

2,4-Dihydro-7-methoxy-2,4,4-trimethyl[1]benzopyrano[4,3-c]pyrazole hydrobromide

Is prepared from 2,2-dimethyl-3-formyl-7-methoxy-4-chromanone and methylhydrazine as described in example 8. The free base melts at 69°–70° (hydrobromide salt, m.p. 202°–204°).

$\nu_{max}^{Nujol}$ 1630 cm.$^{-1}$.

Anal. Calcd. for $C_{14}H_{16}N_2O_2$: N, 11.47. Found: N, 11.34.

EXAMPLE 16

1,4-Dihydro-7-butoxy-1,4,4-trimethyl[1]benzopyrano[4,3-c]pyrazol-9-ol
2,4-Dihydro-7-butoxy-2,4,4-trimethyl[1]benzopyrano[4,3-c]pyrazol-9-ol Both compounds are prepared from 2,2-dimethyl-3-formyl-5-hydroxy-7-butoxy-4-chromanone and methyl hydrazine as described in example 8. The crude mixture of solid bases obtained by concentrating the ether to dryness is taken up in 6 parts of ether and 15 parts of petroleum ether to give 27 percent of 1,4-dihydro-7-butoxy-1,4,4-trimethyl[1]benzopyrano[4,3-c]pyrazol-9-ol, m.p. 168.5°.

$\nu_{max}^{Nujol}$ 1630 cm.$^{-1}$.

Anal. Calcd. for $C_{17}H_{22}N_2O_3$: C, 67.52; H, 7.33; N, 9.27. Found: C, 67.80; H, 7.38; N, 8.97.

The mother liquors are concentrated to dryness and are taken up in a small amount of petroleum ether (a small amount of the first isomer is insoluble and is filtered off). The filtered solution is cooled to give 37 percent of 2,4-dihydro-7-butoxy-2,4,4-trimethyl[1]benzopyrano[4,3-c]pyrazol-9-ol, m.p. 82°.

$\nu_{max}^{Nujol}$ 1640, 3300 cm.$^{-1}$.

Anal. Calcd. for $C_{17}H_{22}N_2O_3$: C, 67.52; H, 7.33; N, 9.27. Found: C, 67.51; H, 7.28; N, 9.16.

EXAMPLE 17

1,4-Dihydo-4,4-dimethyl-1-phenethyl-7-butoxy[1]benzopyrano[d4,3-c]pyrazol-9-ol

Is prepared from 2,2-dimethyl-3-formyl-5-hydroxy-7-butoxy-4-chromanone and phenethyl hydrazine, as described in example 8. The product melts at 136°–137°.

$\nu_{max}^{Nujol}$ 1620 cm.$^{-1}$.

Anal. Calcd. for $C_{24}H_{28}N_2O_3$: C, 73.44; H, 7.19; N, 7.14. Found: C, 73.53; H, 6.94; N, 7.22.

EXAMPLE 18

2,4-Dihydro-2-benzyl-7-methoxy-4,4-dimethyl[1]benzopyrano[d4,3-c]pyrazole hydrobromide To a solution of 0.28 g. of sodium in 10 ml. of ethanol is added a solution of 2.30 g. of 1,4-dihydro-7-methoxy-4,4-dimethyl[1]bbenzopyrano[4,3-c]pyrazole in 5 ml. of ethanol. There is then added dropwise with stirring at reflux, 3 g. of benzylchloride. A precipitate forms immediately. The mixture is refluxed for one-half hour, and is then concentrated to dryness. The residue is partitioned between ether and 6N HCl and the acid phase is neutralized with 10 percent potassium hydroxide solution. The oil is extracted with methylene chloride. The solution is then concentrated to 7.2 g. of oil which is converted to its hydrobromide salt and recrystallized from acetonitrile, m.p. 188°–190°.

$\nu_{max}^{Nujol}$ 1625, 2450 cm.$^{-1}$.

Anal. Calcd. for $C_{20}H_{20}N_2O_2 \cdot HBr$: C, 59.86; H, 5.27; N, 6.98; Br, 19.91. Found: C, 59.54; H, 5.24; N, 6.94; Br, 19.82.

EXAMPLE 19

2,4-Dihydro-7-methoxy-2,4,4-trimethyl[1]benzopyrano[4,3-c]pyrazole hydrobromide

Is prepared by alkylation of 1,4-dihydro-7-methoxy-4,4-dimethyl[1]bbenzopyrano[4,3-c]pyrazole with methyl iodide as described in example 17. The product is identical to that obtained in example 15.

EXAMPLE 20

1,4-Dihydro-1-[3-(dimethylamino)propyl]-7-methoxy-4,4-dimethyl [1]benzopyrano[4,3-c]pyrazole
2,4-Dihydro-2-[3-(dimethylamino)propyl]-7-methoxy-4,4-dimethyl[1]benzopyrano[-c]pyrazole Is prepared from 1,4-dihydro-7-methoxy-4,4-dimethyl[1]benzopyrano[4,3-c]pyrazole by alkylation with 3-dimethylaminopropylchloride as described in example 18. The oily mixture of bases has a b.p. of 178°–180°/.017 min.

$\nu_{max}^{film}$ 1620 cm.$^{-1}$.

Anal.Calcd. for $C_{18}H_{25}N_3O_2$: C, 68.54; H, 7.97; N, 13.32. Found: C, 68.43; H, 8.02; N, 13.12.

EXAMPLE 21

2,2-Dimethyl-3-chlorovinyl-7-methoxy-4-chromanone
A solution of 2.34 g. of 2,2-dimethyl-3-formyl-7-methoxy-4-chromanone in 25 ml. of ether is treated with 1.42 g. of thionyl chloride in 10 ml. of ether and the solution is refluxed for 24 hours. The ether is removed, and the residue is then evaporated to dryness three times from benzene to insure complete removal of the thionyl chloride. The oily residue is then used directly for the subsequent step.

$\nu_{max}^{film}$ 1610, 1660 cm.$^{-1}$.

EXAMPLE 22

1,4-Dihydro-7-methoxy1-phenyl-4,4-dimethyl-[1]-benzopyrano-[4,3-c]pyrazole
A mixture of 7.6 g. of 2,2-dimethyl-3-chlorovinyl-7-methoxy-4-chromanone and 6.5 g. of phenylhydrazine in 60 ml. of ethanol is refluxed for 24 hours. The solution is concentrated to dryness and the residue is partitioned between water and ether. The ether is washed with cold 5 percent NaOH and water, dried and concentrated to 9.1 g. of heavy oil. This is flash distilled, b.p. 160° at 0.03 mm., and the distillate recrystallized from ether-petroleum ether to give 4.8 of white crystals, m.p. 124°.

$\nu_{max}^{Nujol}$ 1610, 1615.

Anal. Calcd. for $C_{19}H_{18}N_2O_2$: C, 74.49; H, 5.92; N, 9.15. Found: C, 74.76; H, 5.92; N, 9.29.

EXAMPLE 23

1,4-Dihydro-4,4-dimethyl[1]benzopyrano[4,3-c]pyrazole-7,9-diol hydrobromide
A solution of 4.8 g. of 1,4-dihydro-7,9-dimethoxy-4,4-dimethyl[1]bbenzopyrano[4,3-c]pyrazole in 100 ml. of 48 percent hydrobromic acid is refluxed for 6 hours. The solution is concentrated to dryness and the solid residue recrystallized from acetonitrile to give 5.1 g. of off-white crystals, m.p. 244°–247°.

$\nu_{max}^{Nujol}$ 1640, 3150, 3220 cm.$^{-1}$.

Anal. Calcd. for $C_{12}H_{12}N_2O_3 \cdot HBr$: C, 46.03; H, 4.18; N, 8.95. Found: C, 46.27; H, 4.18; N, 9.06.

EXAMPLE 24

1,4-Dihydro-4,4-dimethyl[1]benzopyrano[4,3-c]pyrazol-7-ol hydrobromide
Is prepared from 1,4-dihydro-7-methoxy-4,4-dimethyl[1]benzopyrano[4,3-c]pyrazole as described in example 23.The product melts at 233°–226°.

$\nu_{max}^{Nujol}$ 1630, 3320 cm.$^{-1}$.

Anal. Calcd. for $C_{12}H_{12}N_2O_2 \cdot HBr$: C, 48.50; H, 4.41; N, 9.43; Br, 26.89. Found: C, 48.58; H, 4.43; N, 9.51; Br, 27.03.

EXAMPLE 25

1,4-Dihydro-4,4-dimethyl[1]benzopyrano[4,3-c]pyrazol-7,8-diol hydrobromide
Is prepared from 1,4-dihydro-7,8-dimethoxy-4,4-dimethyl[1]bbenzopyrano[4,3-c]pyrazole as described in example 23. The product melts at 229°–232°.

$\nu_{max}^{Nujol}$ 1630, 3200, 3500 cm.$^{-1}$.

Anal. Calcd. for $C_{12}H_{12}N_2O_3 \cdot HBr$: C, 46.03; H, 4.18; N, 8.95. Found: C, 4602; H, 4.19; N, 8.71.

EXAMPLE 26

7-[3-(Dimethylamino)propoxyl]-2,2-dimethyl-4-chromanone
A solution of 10.3 g. of 7-hydroxy-4-chromanone in 100 ml. of acetone is stirred vigorously with 16 g. of potassium carbonate while 8 g. of 3-chloro-N,N-dimethylpropylamine hydrochloride in 100 ml. of acetone are added dropwise. The mixture is refluxed for 5 hours, is then concentrated to dryness and the residue is partitioned between water and ether. The ether layer is washed with water, dried, and concentrated to an oil. The oil is distilled at 130°/0.02 min.

$\nu_{max}^{film}$ 1610, 1680 cm.$^{-1}$.

Anal. Calcd. for $C_{16}H_{23}NO_3$: C, 69.28; H, 8.36; N, 5.05. Found: C, 68.87; H, 8.43; N, 4.33.

EXAMPLE 27

7-Butoxy-5-hydroxy-2,2-dimethyl-4-chromanone
A mixture of 20.8 g. of 5,7-dihydroxy-2,2-dimethyl-4-chromanone, 20.2 g. of butyl iodide, 20 g. of potassium carbonate and 250 ml. of acetone is refluxed with stirring, for 26 hours. The mixture is worked up as described in example 26 to afford a crystalline solid, m.p. 61°–62°. It is then recrystallized from ethanol water to give m.p. 62.5°.

$\nu_{max}^{Nujol}$ 1620–1660 cm.$^{-1}$.

Anal. Calcd. for $C_{15}H_{20}O_4$: C, 68.16; H, 7.63. Found: C, 68.45; H, 7.67.

What is claimed is:
1. A compound of the formula:

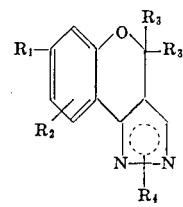

wherein $R_1$ is hydroxy, lower alkoxy or ω-diloweralkylaminoloweralkoxy; $R_2$ is hydrogen, hydroxy, lower alkoxy or ω-diloweralkylaminoloweralkoxy; $R_3$ is hydrogen or lower alkyl; $R_4$ is hydrogen, lower alkyl, phenyl, phenyl lower alkyl or ω-diloweralkylaminoloweralkyl and its pharmaceutically acceptable acid addition salts thereof.
2. A compound of claim 1 which is 1,4-dihydro-7-methoxy-4,4-dimethyl[1] benzopyrano-[4,3-c] pyrazole.
3. A compound of claim 1 which is 2,4-dihydro-7,8-dimethoxy-4,4-dimethyl[1] benzopyrano[4,3-c] pyrazole.
4. A compound of claim 1 which is 1,4-dihydro-7-[3-(dimethylamino)propoxy]-4,4-dimethyl[1] benzopyrano[4,3-c] pyrazole.

5. A compound of claim 1 which is 1,4-dihydro-7-methoxy-4-methyl[1]benzopyrano[4,3-c]pyrazole.

6. A compound of claim 1 which is 2,4-dihydro-7-methoxy-2,4,4-trimethyl[1]benzopyrano[4,3-c]pyrazole.

7. A compound of claim 1 which is: 1,4-dihydro-7-butoxy-1,4,4-trimethyl[1]benzopyrano[4,3-c]pyrazol-9-ol.

8. A compound of claim 1 which is 1,4-dihydro-4,4-dimethyl-1-phenethyl-7-butoxy[1]benzopyrano[4,3-c]pyrazol-9-ol.

9. A compound of claim 1 which is 2,4-dihydro-2-benzyl-7-methoxy-4,4-dimethyl[1]benzopyrano[4,3-c]pyrazole.

10. A compound of claim 1 which is 2,4-dihydro-7-methoxy-2,4,4-trimethyl[1]benzopyrano[4,3-c]pyrazole.

11. A compound of claim 1 which is 1,4-dihydro-1-[3-(dimethylamino)propyl]7-methoxy-4,4-dimethyl[1]benzopyrano[4,3d-c]pyrazole.

12. A compound of claim 1 which is 1,4-dihydro-7-methoxy-1-phenyl-4,4-dimethyl-[1]-benzopyrano[4,3-c]pyrazole.

13. A compound of claim 1 which is 1,4-dihydro-4,4-dimethyl[1]benzopyrano[4,3-c]pyrazole-7,9-diol hydrobromide.

14. A compound of claim 1 which is 1,4-dihydro-4,4-dimethyl[1]benzopyrano[pyrazol-7ol hydrobromide.

15. A compound of claim 1 which is 1,4-dihydro-4,4-dimethyl[1]benzopyrano[4,3-c]pyrazol-7,8-diol hydrobromide.

* * * * *